United States Patent
Guen

(10) Patent No.: US 8,999,568 B2
(45) Date of Patent: Apr. 7, 2015

(54) SECONDARY BATTERY HAVING AN ELECTRODE TERMINAL INCLUDING A COLLECTING PLATE, A CONNECTING PART, AND A TERMINAL PART

(75) Inventor: Minhyung Guen, Yongin (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 825 days.

(21) Appl. No.: 13/067,943

(22) Filed: Jul. 8, 2011

(65) Prior Publication Data
US 2012/0058389 A1     Mar. 8, 2012

(30) Foreign Application Priority Data
Sep. 8, 2010   (KR) ................. 10-2010-0088019

(51) Int. Cl.
H01M 2/02      (2006.01)
H01M 2/04      (2006.01)
H01M 2/06      (2006.01)
H01M 2/08      (2006.01)
H01M 2/26      (2006.01)
H01M 2/30      (2006.01)
H01M 10/052    (2010.01)
H01M 10/058    (2010.01)

(52) U.S. Cl.
CPC .............. *H01M 2/26* (2013.01); *H01M 2/0237* (2013.01); *H01M 2/30* (2013.01); *H01M 10/052* (2013.01); *H01M 10/058* (2013.01); *Y02T 10/7011* (2013.01); *Y02E 60/122* (2013.01)

(58) Field of Classification Search
USPC .................................. 429/163, 178, 179, 180
See application file for complete search history.

(56) References Cited

U.S. PATENT DOCUMENTS

| | | | |
|---|---|---|---|
| 4,873,160 A | 10/1989 | Miyazaki et al. | |
| 5,955,217 A | 9/1999 | Van Lerberghe | |
| 6,586,134 B2 * | 7/2003 | Skoumpris | 429/178 |
| 2002/0022179 A1 | 2/2002 | Yuasa et al. | |
| 2004/0121231 A1 | 6/2004 | Kim | |
| 2005/0221178 A1 | 10/2005 | Kim | |

(Continued)

FOREIGN PATENT DOCUMENTS

EP         1246275 A2     10/2002
JP         2001-319682    11/2001

(Continued)

OTHER PUBLICATIONS

Korean Office Action dated Sep. 8, 2011.

(Continued)

*Primary Examiner* — Sean P Cullen
(74) *Attorney, Agent, or Firm* — Lee & Morse, P.C.

(57) ABSTRACT

A secondary battery includes a case and an electrode assembly in the case that includes a first electrode plate, a separator, and a second electrode plate. The secondary battery also includes a cap plate coupled with the case and a first electrode terminal electrically connected to the first electrode plate. The first electrode terminal includes a first collecting plate connected to the electrode assembly, a first connecting part extending from the first collecting plate, and a first terminal part extending from the first connecting part. The first connecting part passes through a gap between the cap plate and the case, and the first connecting part extends to an outer surface of the cap plate. The first terminal part protrudes beyond the cap plate.

19 Claims, 7 Drawing Sheets

(56) References Cited

U.S. PATENT DOCUMENTS

| | | | |
|---|---|---|---|
| 2006/0263685 A1* | 11/2006 | Kwon | 429/185 |
| 2007/0059592 A1* | 3/2007 | Takami et al. | 429/161 |
| 2009/0162747 A1* | 6/2009 | Zhu et al. | 429/160 |
| 2010/0159291 A1 | 6/2010 | Kim | |

FOREIGN PATENT DOCUMENTS

| | | |
|---|---|---|
| JP | 2002-170594 | 6/2002 |
| JP | 2005-302719 | 10/2005 |
| JP | 2007-179793 A | 7/2007 |
| KR | 10 2003-0057349 A | 7/2003 |
| KR | 10 2009-0127809 A | 12/2009 |
| KR | 10 2010-0073762 A | 7/2010 |

OTHER PUBLICATIONS

European Search Report dated Oct. 31, 2011.
Korean Office Action dated Apr. 23, 2012.

* cited by examiner

SECONDARY BATTERY HAVING AN ELECTRODE TERMINAL INCLUDING A COLLECTING PLATE, A CONNECTING PART, AND A TERMINAL PART

BACKGROUND

Embodiments relate to a secondary battery. Secondary batteries may be rechargeable batteries unlike primary batteries that are not rechargeable. Such a secondary battery may be packaged to form, e.g., a small capacity battery or a large capacity battery. Small capacity batteries may be used in electronic devices, e.g., portable small electronic devices such as cellular phones and camcorders. Large capacity battery, which may include a plurality of battery packs arrayed and electrically connected to one another, may be used as a power source for driving a motor, e.g., an electric scooter, a hybrid vehicle, and an electric vehicle.

SUMMARY

Embodiments may be realized by providing a secondary battery that includes a case, an electrode assembly in the case having a first electrode plate, a separator, and a second electrode plate, and a cap plate coupled with the case. A first electrode terminal electrically connected to the first electrode plate includes a first collecting plate electrically connected to the electrode assembly, a first connecting part extending from the first collecting plate and passing through a gap between the cap plate and the case and extending to an outer surface of the cap plate, and a first terminal part extending from the first connecting part and protruding beyond the cap plate.

The first collecting plate, the first connecting part, and the first terminal part of the first electrode terminal may be integrally formed as one continuous piece that extends from an inside of the case to an outside of the case. The first connecting part may include a first bent region bent from the first collecting plate and coupled to a lower surface of the cap plate, a first pass region extending from the first bent region and passing through the gap between the cap plate and the case, and a second bent region bent from the first pass region and coupled to the upper surface of the cap plate.

The cap plate may include a first coupling recess coupled with the second bent region of the first connecting part. The first bent region of the first connecting part may be laser-weldingly coupled to the inner surface of the cap plate. The first bent region, the first pass region, and the second bent region of the first connecting part may be integrally formed and the cap plate may be between the first bent region and the second bent region. The first bent region and second bent region may be substantially parallel to the cap plate and the first pass region may be substantially perpendicular to the first bent region and the second bent region such that the first bent region, the first pass region, and the second bent region surround a lateral end of the cap plate.

The first terminal part may include a first region bent from the first connecting part and extending away from the cap plate, a second region bent from the first region and spaced apart from the cap plate, a third region bent from the second region and extending toward the cap plate, and a fourth region bent from the third region and coupled to the cap plate. The first region, the second region, and the third region of the terminal part may be integrally formed as a protrusion on the cap plate. The cap plate may include a second coupling recess coupled with the fourth region.

The first electrode terminal may be electrically connected to the cap plate. The first electrode terminal may include aluminum or aluminum alloy.

A side of the case may be provided with a coupling ledge and the first connecting part of the first electrode terminal may be coupled to the coupling ledge. A first pass region of the first connecting part may be between the cap plate and the case, and the first pass region may overlap the coupling ledge of the case.

The cap plate may be laser-weldingly coupled to the case. The first connecting part may be laser-weldingly coupled to the case.

A second electrode terminal may be electrically connected to the second electrode plate. The second electrode terminal may include a second collecting plate electrically connected to the electrode assembly, a second terminal column electrically connected to the second collecting plate and passing through the cap plate, and a second terminal plate on the outer surface of the cap plate and coupled to the second terminal column.

The first terminal part may extend a first distance away from the outer surface of the cap plate and the second terminal column may extend a second distance away from the outer surface of the cap plate. The first and second distances may be the same.

The second electrode terminal may include copper or copper alloy. An insulation member may be between the second electrode terminal and the cap plate.

BRIEF DESCRIPTION OF THE DRAWINGS

Features will become more apparent to those of ordinary skill in the art by describing in detail exemplary embodiments with reference to the attached drawings, in which.

DETAILED DESCRIPTION

Figure 1:
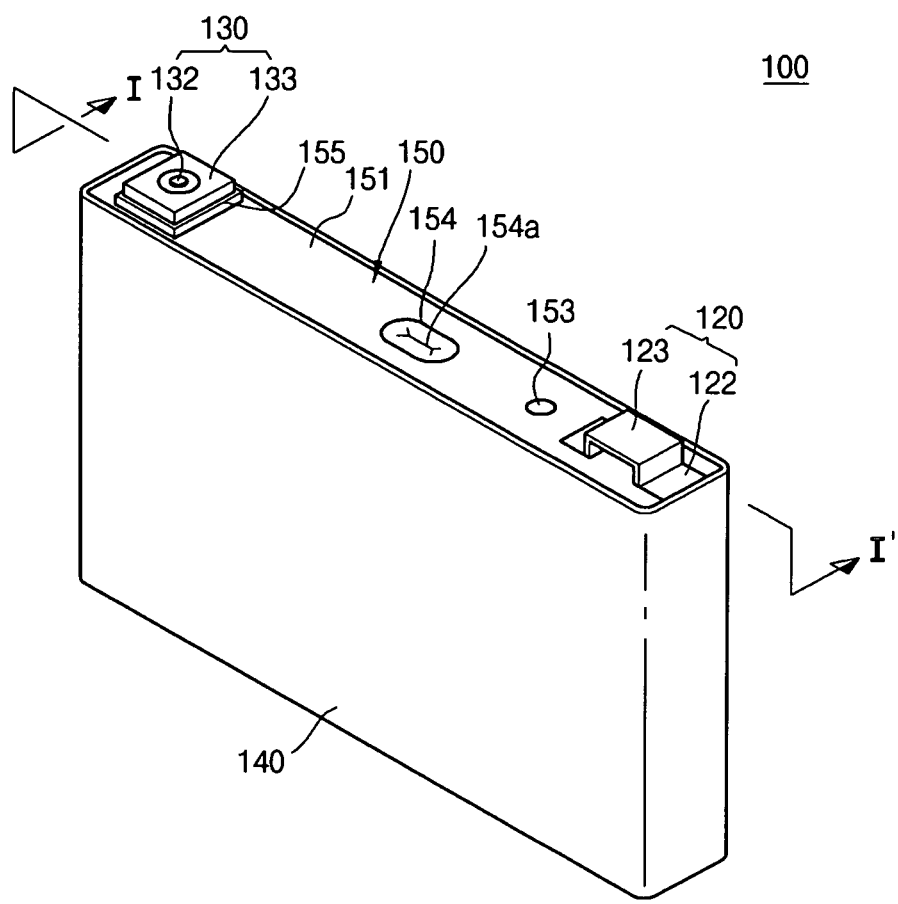
FIG. 1 illustrates a perspective view of a secondary battery, according to an exemplary embodiment.

Korean Patent Application No. 10-2010-0088019 filed on Sep. 8, 2010, in the Korean Intellectual Property Office, and entitled: "Secondary battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, embodiments will be described in detail with reference to the accompanying drawings.

Figure 2:
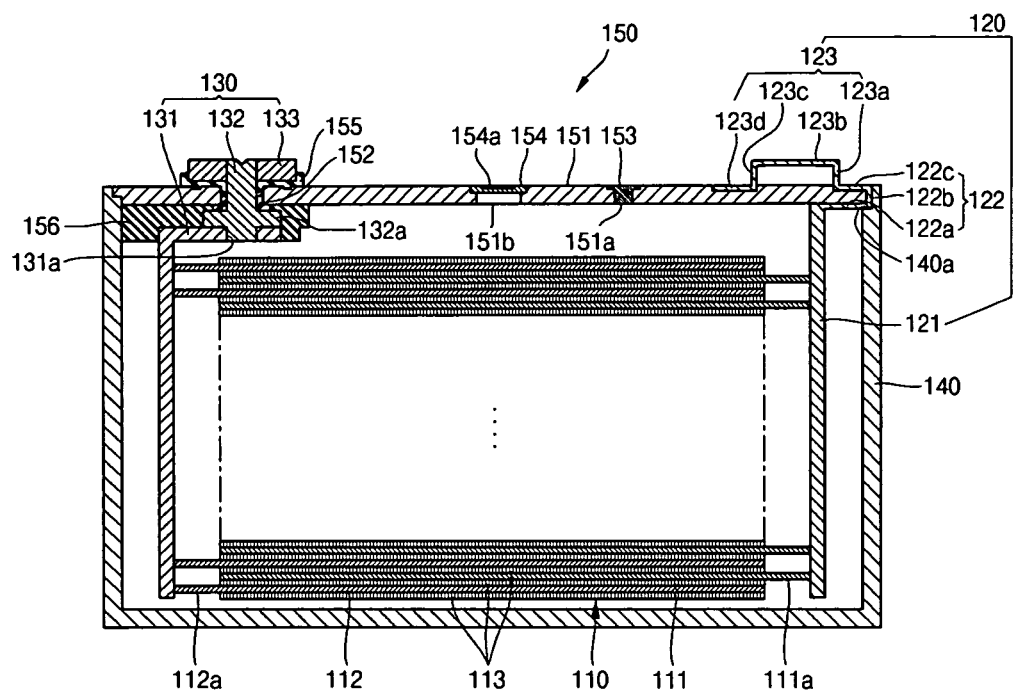
FIG. 2 illustrates a horizontal cross-sectional view taken along line I-I' of FIG. 1.
Figure 3:
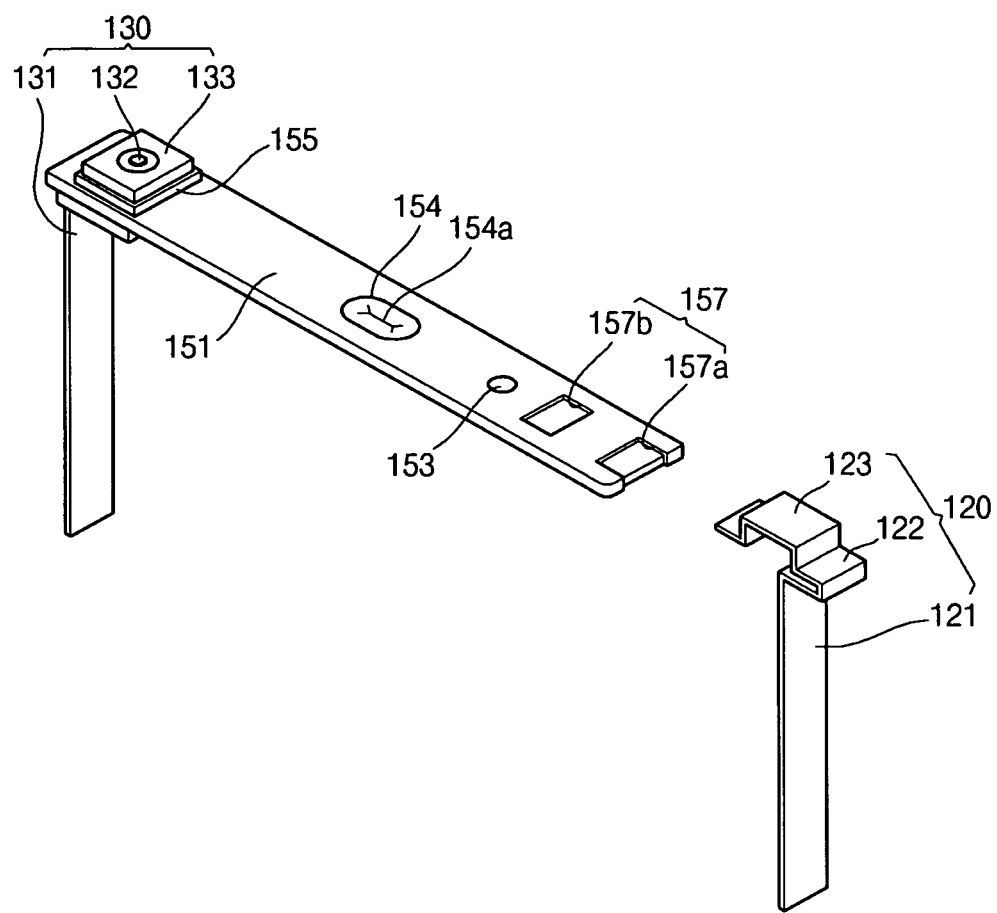
FIG. 3 illustrates an exploded perspective view of a cap plate, a first electrode terminal, and a second electrode terminal illustrated in FIG. 1.
Figure 4:
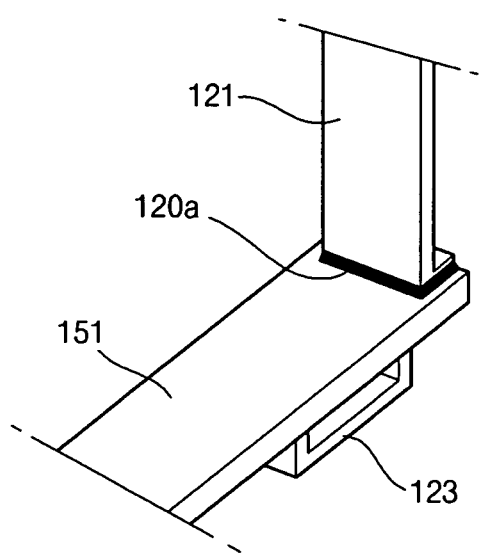
FIG. 4 illustrates a perspective view of a bottom part of an assembly of the cap plate and the first electrode terminal illustrated in FIG. 3.

FIG. 1 illustrates a perspective view of a secondary battery according to an exemplary embodiment. FIG. 2 illustrates a horizontal cross-sectional view taken along line I-I' of FIG. 1. FIG. 3 illustrates an exploded perspective view of a cap plate, a first electrode terminal, and a second electrode terminal illustrated in FIG. 1. FIG. 4 illustrates a perspective view of a bottom part of an assembly of the cap plate and the first electrode terminal illustrated in FIG. 3.

Referring to FIGS. 1 through 4, a secondary battery 100 may include a case 140, a cap assembly 150, an electrode assembly 110, a first electrode terminal 120, and a second electrode terminal 130.

The case 140 may be formed of a conductive metal such as aluminum, aluminum alloy, or steel plated with nickel. The case 140 may have an opening through which the electrode assembly 110, the first electrode terminal 120, and the second electrode terminal 130 may be inserted and placed. Although the opening is not shown in FIG. 2 since an assembly of the case 140 and the cap assembly 150 is illustrated in FIG. 2, a periphery of the cap assembly 150 substantially forms the opening. As such in an assembly battery, the cap assembly 150 may cover the opening in the case 140. For example, the cap assembly 150 may include a cap plate 151 that extends over the opening in the case 140.

The electrode assembly 110 may be formed by winding or stacking a first electrode plate 111, a separator 113, and a second electrode plate 112. The first electrode plate 111, the separator 113, and the second electrode plate 112 may have a thin plate shape or a film shape. The first electrode plate 111 may function as a positive electrode or a negative electrode, and the second electrode plate 112 may have the opposite pole to that of the first electrode 111. The separator may be disposed between the first electrode plate 111 and the second electrode plate 112.

The first electrode plate 111 may be formed by applying a first electrode active material such as a transition metal oxide on a first electrode collector formed of metal foil such as aluminum foil. The first electrode plate 111 may include a first electrode non-coating portion 111a on which the first electrode active metal is not applied. The first electrode non-coating portion 111a may function as a passage for a current between the first electrode plate 111 and the outside of the first electrode plate 111. For example, the first electrode non-coating portion 111a may connect the first electrode plate 111 to the first electrode terminal 120. The material of the first electrode plate 111 is not limited to the transition metal oxide and a metal foil, and other materials having the same or similar functions may be used.

The second electrode plate 112 may be formed by applying a second electrode active material such as graphite or carbon on a second electrode collector formed of metal foil such as nickel or copper foil. The second electrode plate 112 may include a second electrode non-coating portion 112a on which the second electrode active metal is not applied. The second electrode non-coating portion 112a may function as a passage for a current between the second electrode plate 112 and the outside of the second electrode plate 112. For example, the second electrode non-coating portion 112a may connect the second electrode plate 112 to the second electrode terminal 130. The material of the second electrode plate 112 is not limited to the graphite or carbon and a metal foil, and other materials having the same or similar functions may be used.

The first and second electrode plates 111 and 112 may be disposed to change their poles with each other. For example, the second electrode active material discussed above may be applied to the first electrode plate 111 instead of the second electrode plate 112.

The separator 113 may be disposed between the first electrode plate 111 and the second electrode plate 112 to reduce the possibility of and/or prevent a short circuit and allow the movement of lithium ions. The separator 113 may be formed of a polymer such as polyethylene or a combined film of polypropylene and polyethylene. The material of the separator 113 is not limited to polyethylene or a combined film, and other materials having the same or similar functions may be used.

Both ends of the electrode assembly 110 may be coupled with first and second electrode terminals 120 and 130 that are electrically connected to the first and second electrode plates 111 and 112, respectively. For example, one end of the electrode assembly 110 may include the first electrode terminal 120 that is electrically connected to the first electrode plate 111. Another end of the electrode assembly 110, e.g., an end opposite the one end including the first electrode terminal 120, may include the second electrode terminal 130 that is electrically connected to the second electrode plate 112.

The electrode assembly 110 together with an electrolyte may be disposed in the case 140. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as lithium hexafluorophosphate ($LiPF_6$) or lithium tetrafluorophosphate ($LiBF_4$). The electrolyte may be in the form of a liquid, a solid, or a gel.

The first electrode terminal 120 may be formed of a conductive material such as aluminum or aluminum alloy. The first electrode terminal 120 may be electrically connected to the first electrode plate 111. The first electrode terminal 120 may include a first collecting plate 121, a first connecting part 122, and a first terminal part 123.

The first collecting plate 121 may contact, e.g., be directly coupled to, the first electrode non-coating portion 111a protruding from an end of the electrode assembly 110. The first collecting plate 121 may extend in a first direction. The first direction may be substantially parallel to a sidewall of the case 140. The first collecting plate 121 may extend from a first portion of the case 140 to a second portion of case 140 to overlap the electrode assembly 110, e.g., to overlap substantially the entire electrode assembly 110. The first collecting plate 121 may be welded to the first electrode non-coating portion 111a. For example, the first collecting plate 121 may be welded to each of a plurality of first electrode non-coating portions 111a extending from the electrode assembly 110. The first collecting plate 121 may be formed of aluminum or aluminum alloy. However, the material of the first collecting plate 121 is not limited thereto, and other materials having the same or similar functions may be used.

The first connecting part 122 may extend from the first collecting plate 121, e.g., may be a protruding portion extending from the first collecting plate 121. The first connecting part 122 may be integrally formed with the first collecting plate 121 or may be a separate piece connected to the first collecting plate 121. The first connecting part 122 may pass through a gap between the cap plate 151 and the case 140. The first connecting part 122 may extend to an upper surface of the cap plate 151. The first connecting part 122 may be formed of aluminum or aluminum alloy. However, the material of the first connecting part 122 is not limited thereto, and other materials having the same or similar functions may be used.

The first connecting part 122 may include a first bent region 122a, a first pass region 122b, and a second bent region 122c. The first bent region 122a, the first pass region 122b, and the second bent region 122c may be integrally formed as one continuous piece or may be separate pieces assembled together.

The first bent region 122a may be bent from the first collecting plate 121, e.g., the first bent region 122a may extend in a second direction that intersects the first direction in which the first collecting plate 121 extends. The first bent region 122a may be closely adhered to an inner surface of the cap plate 151 that faces the electrode assembly 110, e.g., the lower surface, of the cap plate 151. Referring to FIG. 4, the first bent region 122a may be directly coupled, e.g., directly welded, to the lower surface of the cap plate 151. For example, the first bent region 122a may be laser-welded to the lower surface of the cap plate 151. Therefore, a welded region 120a may be formed on a boundary between the first bent region 122a and the cap plate 151. A portion of the first bent region 122a or substantially an entire length of the first bent region 122a may be coupled to the lower surface of the cap plate 151. Accordingly, the first electrode terminal 120 may be fixed to the cap plate 151.

The first pass region 122b may be bent from the first bent region 122a. The first pass region 122b may extend in a third direction that intersects the second direction in which the first bent region 122a extends. The first pass region 122b may pass through the gap between the cap plate 151 and the case 140. That is, the first pass region 122b may be disposed between a lateral end of the cap plate 151 and a sidewall of the case 140.

The second bent region 122c may be bent from the first pass region 122b. The second bent region 122c may extend in a fourth direction that intersects the third direction in which the first pass region 122b extends. The second bent region 122c may be closely adhered to an outer surface, e.g., the upper surface, of the cap plate 151. The outer surface may oppose the inner surface of the cap plate 151 having the first bent region 122a adhered thereto. The cap plate 151 may be provided with a first coupling recess 157a to which the second bent region 122c is coupled. At least a portion of the second bent region 122c may be seated inside the first coupling recess 157a. That is, the second bent region 122c may be bent from the first pass region 122b and may be coupled to the first coupling recess 157a formed on the cap plate 151.

The first connecting part 122 may extend from a side of the cap plate 151 to partially surround the upper and lower surfaces of the cap plate 151. For example, first bent region 122a, the first pass region 122b, and the second bent region 122c of the first connecting part may surround a lateral end of the cap plate such that the lateral end of the cap plate is seating inside the first connecting part 122. The first connecting part 122 may be disposed between the cap plate 151 and the case 140, and may be coupled to a coupling ledge 140a formed on the case 140. According to an exemplary embodiment, the first bent region 122a may be substantially perpendicular to the first collecting plate 121, the first pass region 122b may be substantially perpendicular to the first bent region 122a, and the second bent region 122c may be substantially perpendicular to the first pass region 122b.

The first terminal part 123 may extend from the first connecting part 122. The first terminal part 123 may be integrally formed with the first connecting part 122 or may be a separate piece. The first terminal part 123 may protrude out from the first connecting part 122. The first terminal part 123 may include a portion extending away from the cap plate 151 and a portion extending toward the cap plate 151 such that the first terminal part 123 forms a protrusion on the cap plate 151.

The first terminal part 123 may include a first region 123a, a second region 123b, a third region 123c, and a fourth region 123d. The first region 123a, the second region 123b, the third region 123c, and the fourth region 123d may be integrally formed as one continuous piece or may be separate pieces assembled together.

The first region 123a may be bent from the first connecting part 122. The first region 123a may extend in fifth direction away from the cap plate 151. The fifth direction may intersect the fourth direction in which the second bent region 122c of the first connecting part 122 extends. The first terminal part 123 may be formed of aluminum or aluminum alloy. However, the material of the first terminal part 123 is not limited thereto, and other materials having the same or similar functions may be used.

The second region 123b may be bent from the first region 123a. The second region 123b may be spaced apart from the cap plate 151. For example, the second region 123b may be spaced apart from the cap plate 151 by an amount substantially equal to a height of the first region 123a. The second region 123b may extend in a sixth direction in a plane above the cap plate 151. The sixth direction may intersect the fifth direction in which the first region 123a extends. The second region 123b may be substantially parallel to the cap plate 151, and may be substantially perpendicular to the first region 123a. An outer bus bar (not shown) may be connected to the second region 123b.

The third region 123c may be bent from the second region 123b. The third region 123c may extend in a seventh direction toward the cap plate 151. The seventh direction may be substantially parallel to the fifth direction in which the first region 123a extends, and may intersect the sixth direction in which the second region 123b extends. For example, the third region 123c may be spaced apart from the first region 123a by an amount substantially equal to a length of the second region 123b.

The fourth region 123d may be bent from the third region 123c, and may be coupled to the upper surface of the cap plate 151. The fourth region 123d may extend in a direction substantially parallel to the cap plate 151. The cap plate 151 may include a second coupling recess 157b to which the fourth region 123d is coupled. At least a portion of the fourth region 123d may be seated inside the second coupling recess 157b. That is, the fourth region 123d may be bent from the third region 123c, and may be coupled to the second coupling recess 157b formed on the cap plate 151. The second coupling recess 157b may be spaced apart from the first coupling recess 157a having the second bent region 122c coupled thereto.

According to an exemplary embodiment of the first terminal part 123, the first region 123a may be substantially perpendicular to the second bent region 122c of the first connecting part 122, the second region 123b may be substantially perpendicular to the first region 123a, the third region 123c may be substantially perpendicular to the second region 123b, and the fourth region 123d may be substantially perpendicular to the third region 123c.

The first terminal part 123 may protrude from the cap plate 151 and may have a same height as that of a second terminal column 132 of a second electrode terminal 130 to be described later. That is, the first and second electrode terminals 120 and 130 may have different shapes, but may have the same height, e.g., may be spaced apart a same distance, from the cap plate 151. The first terminal part 123 may be formed of aluminum or aluminum alloy. However, the material of the first terminal part 123 is not limited thereto, and other materials having the same or similar functions may be used.

A bus bar (not shown) formed of, e.g., aluminum or aluminum alloy may be easily welded to the first terminal part 123. The first electrode terminal 120 may be electrically connected to the cap plate 151, so that the cap plate 151 and the case 140 may have the same pole, e.g., a positive pole, as that of the first electrode terminal 120.

According to an exemplary embodiment, the first collecting plate 121, the first connecting part 122, and the first terminal part 123, which constitute the first electrode terminal 120, may be integrally formed. Thus, the first electrode terminal 120 does not require a process such as additional coupling or riveting. As such, a manufacturing process may be simplified and costs may be reduced. Further, integrally forming the first electrode terminal 120 may improve the strength thereof.

The second electrode terminal 130 may be formed of a conductive material such as copper or copper alloy, and may be electrically connected to the second electrode plate 112. The second electrode terminal 130 may include a second collecting plate 131, a second terminal column 132, and a second terminal plate 133.

The second collecting plate 131 may contact, e.g., be directly coupled to, the second electrode non-coating portion 112a protruding from an end of the electrode assembly 110. The second collecting plate 131 may extend in the first direction, e.g., may extend in a direction substantially parallel to the first collecting plate 121. The second collecting plate 131 may extend from a first portion of the case 140 to a second portion of case 140 to overlap the electrode assembly 110, e.g., to overlap substantially the entire electrode assembly 110. The second collecting plate 131 may be welded to the second electrode non-coating portion 112a. For example, the second collecting plate 131 may be welded to each of a plurality of second electrode non-coating portions 112a extending from the electrode assembly 110. The second collecting plate 131 may have an approximately 'L' shape, e.g., the second collecting plate 131 may include a first portion substantially perpendicular to a second portion. The first and second portions of the second collecting plate 131 may be integrally formed. The second collecting plate 131 may be formed of copper or copper alloy. However, the material of the second collecting plate 131 is not limited thereto, and other materials having the same or similar functions may be used.

A terminal hole 131a may be formed in the second portion of the second collecting plate 131. The second terminal column 132 may be fitted into, e.g., inside, the terminal hole 131a.

The second terminal column 132 may pass through the cap plate 151. The second terminal column 132 may protrude a predetermined vertical length above and below the cap plate 151. The second terminal column 132 may be electrically connected to the second collecting plate 131, e.g., through the terminal hole 131a, at the lower side of the cap plate 151. The second terminal column 132 may protrude a predetermined length to the upper side of the cap plate 151 and may have a flange 132a at the lower side of the cap plate 151 to reduce the possibility of and/or prevent the removal of the second terminal column 132 from the cap plate 151. The lower portion of the second terminal column 132 with respect to the flange 132a may be fitted into the terminal hole 131a of the second collecting plate 131. The second terminal column 132 may be electrically insulated from the cap plate 151. For example, the second terminal column 132 may be formed of copper or copper alloy. However, the material of the second terminal column 132 is not limited thereto, and other materials having the same or similar functions may be used.

The second terminal plate 133 may include a hole formed in the center thereof. The second terminal plate 133 may be coupled to the second terminal column 132. That is, the second terminal column 132 may be coupled to the hole of the second terminal plate 133. After the second terminal plate 133 is coupled to the second terminal column 132, the upper portion of the second terminal column 132 may be riveted by the second terminal plate 133. Accordingly, the second terminal plate 133 can be fixed to the second terminal column 132. For example, the second terminal plate 133 may be formed of copper or copper alloy. However, the material of the second terminal plate 133 is not limited thereto, and other materials having the same or similar functions may be used.

The case 140 may be formed of a conductive metal such as aluminum, aluminum alloy, or steel plated with nickel, and may have an approximately hexahedron shape providing with the opening through which the electrode assembly 110, the first electrode terminal 120, and the second electrode terminal 130 may be placed. At least one side of the case 140 may be provided with the coupling ledge 140a, so that the first connecting part 122 of the first electrode terminal 120 can be coupled to the case 140. The first pass region 122b of the first connecting part 122 may overlap and may be seated on, e.g., directly seated on, the coupling ledge 140a. The coupling ledge 140a may be formed so that there is a gap between the cap plate 151 and the case 140, and the first pass region 122b may fill that gap.

The inner surface of the case 140 may be treated so that the case 140 is electrically insulated from the electrode assembly 110, the first and second electrode terminals 120 and 130, and the cap assembly 150. The case 140 may have a pole, e.g., a positive pole.

The cap assembly 150 may be coupled to the case 140. The cap assembly 150 may include the cap plate 151, a seal gasket 152, a plug 153, a safety vent 154, an upper insulation member 155, a lower insulation member 156, and a coupling recess 157. The seal gasket 152, the upper insulation member 155, and the lower insulation member 156 may be disposed between the second electrode terminal 130 and the cap plate 151 to insulate the second electrode terminal 130 and the cap plate 151.

The cap plate 151 may close the opening of the case 140, and may have the same material as that of the case 140. For example, the cap plate 151 may be coupled, e.g., directly attached, to the case 140 through laser welding, e.g., such that edges of the cap plate 151 interface with edges of the case 140. Since the cap plate 151 may have the same pole as that of the first electrode terminal 120 as described above, the cap plate 151 and the case 140 may have the same pole.

The seal gasket 152 may be formed of an electrically insulated material, and may be disposed between the second terminal column 132 and the cap plate 151 to seal the space between the second terminal column 132 and the cap plate 151. The seal gasket 152 may reduce and/or prevent the ingress of moisture into the secondary battery 100 or the leakage of the electrolyte from the secondary battery 100.

The plug 153 may close an electrolyte injection hole 151a of the cap plate 151. The safety vent 154 may be installed in a vent hole 151b of the cap plate 151 and may have a notch 154a that may be opened at a set pressure.

The upper insulation member 155 may be disposed between the cap plate 151 and the second terminal column 132 and/or the second terminal plate 133. The upper insulation member 155 may be closely adhered to the cap plate 151. Furthermore, the upper insulation member 155 may be closely adhered to the seal gasket 152. The upper insulation member 155 may electrically insulate the second terminal column 132 and the cap plate 151.

The lower insulation member 156 may be disposed between the second collecting plate 131 and the cap plate 151 to reduce the possibility of and/or prevent an unnecessary short circuit. That is, the lower insulation member 156 may prevent a short circuit between the second collecting plate 131 and the cap plate 151.

The coupling recess 157 may be disposed at a side of the cap plate 151 to couple the first electrode terminal 120 to the cap plate 151. Referring to FIG. 3, the coupling recess 157 may include a first coupling recess 157a and a second coupling recess 157b. The first coupling recess 157a may be disposed at an end of the cap plate 151, and may be coupled with the second bent region 122c of the first electrode terminal 120. The second coupling recess 157b may be spaced apart from the first coupling recess 157a, and may be coupled with the fourth region 123d of the first electrode terminal 120.

Next, a process of manufacturing a secondary battery will now be described according to an exemplary embodiment.

FIGS. 5A through 5D illustrate cross-sectional views showing a process of manufacturing a secondary battery according to an exemplary embodiment.

Figure 5A:
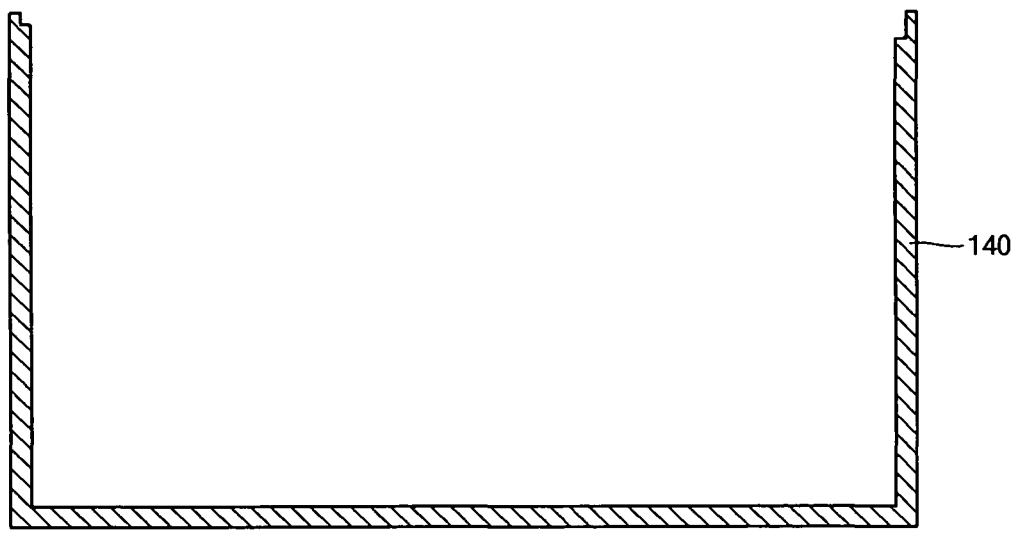
FIGS. 5A through 5D illustrate cross-sectional views showing a process of manufacturing a secondary battery, according to an exemplary embodiment.

As illustrated in FIG. 5A, the hexahedron-shaped case 140 having the opening may be prepared. The case 140 may be formed of a conductive metal such as aluminum, aluminum alloy, or steel plated with nickel.

Figure 5B:
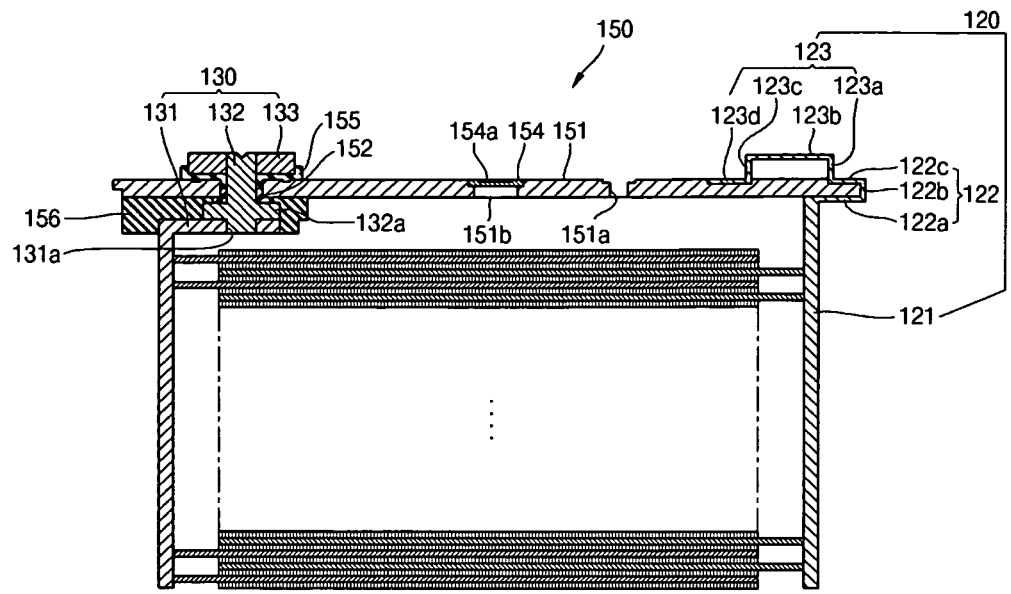

Referring to FIG. 5B, the first and second electrode terminals 120 and 130 may be coupled to the cap assembly 150. The first electrode terminal 120, as a single body, may include the first collecting plate 121, the first connecting part 122, and the first terminal part 123. The first electrode terminal 120 may surround an end, e.g., lateral end, of the cap plate 151. The first electrode terminal 120 may be fixed to the cap plate 151 by laser-welding the first connecting part 122 to the lower surface of the cap plate 151. The second electrode terminal 130 may be formed by coupling the second collecting plate 131, the second terminal column 132, and the second terminal plate 133 to each other through a portion of the cap plate 151. The second electrode terminal 130 may be fixed to the cap plate 151 by coupling the second terminal column 132 with the second terminal plate 133, and then, by riveting the upper portion of the second terminal column 132. The electrode assembly 110 may be electrically connected to the first electrode terminal 120 and the second electrode terminal 130.

Figure 5C:
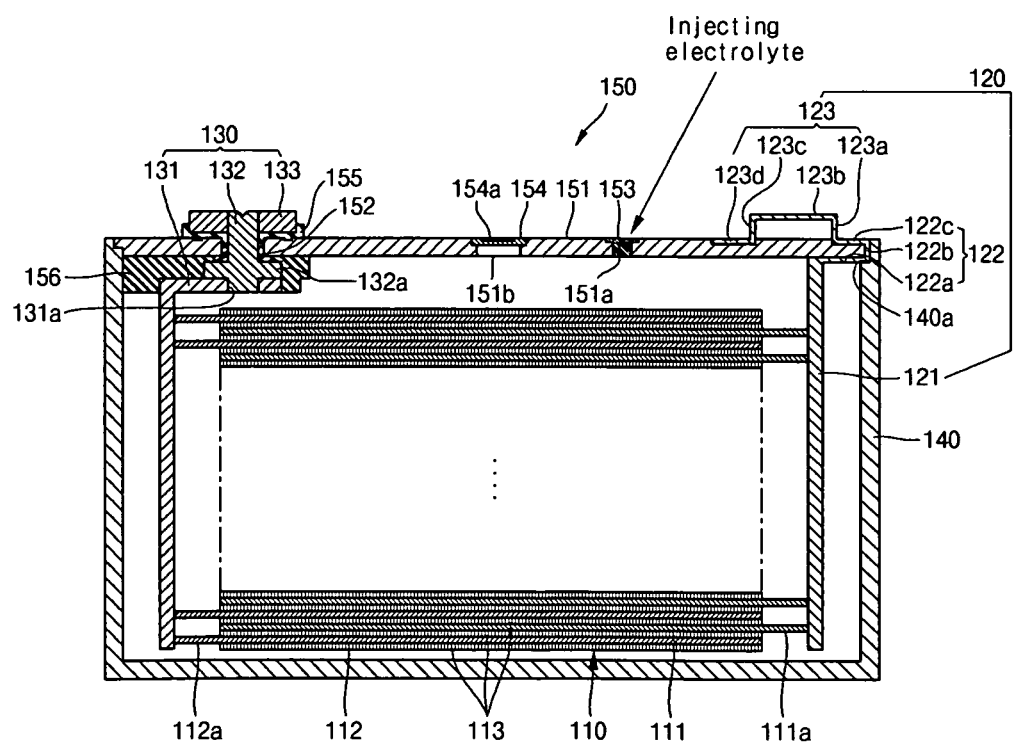

Then, referring to FIG. 5C, the electrode assembly 110, the first electrode terminal 120, the second electrode terminal 130, and the cap assembly 150 may be put into the case 140, and are assembled. Electrolyte may be injected through the electrolyte injection hole 151a of the cap plate 151, and the electrolyte injection hole 151a may be sealed with the plug 153.

Figure 5D:
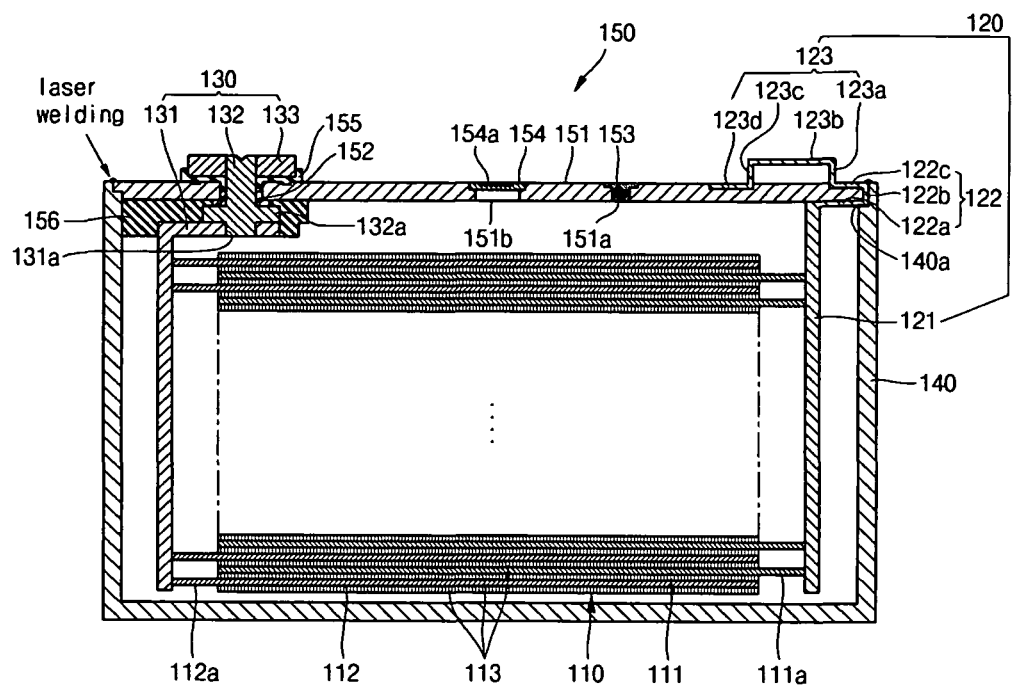

Finally, referring to FIG. 5D, the cap plate 151 may be laser-welded to the opening of the case 140 to complete the secondary battery 100. Since the first connecting part 122 of the first electrode terminal 120 may be disposed between an end of the cap plate 151 and the case 140, the region between the first connecting part 122 and the case 140 may also laser-welded. Accordingly, the opening of the case 140 is sealed through the laser-welding so as to reduce the possibility of and/or prevent the leakage of the electrolyte and the ingress of foreign substances.

By way of summation and review, secondary batteries may be manufactured in various shapes such as a cylindrical shape and a prismatic shape. To form a secondary battery, electrolyte and an electrode assembly formed by interposing a separator as an insulator between a positive electrode plate and a negative electrode plate may be installed in a case. A cap plate may be installed on the case. A positive terminal and a negative terminal may be connected to the electrode assembly. The positive and negative terminals may protrude through the cap plate and may be exposed to the outside.

According to exemplary embodiments, the secondary battery may include the integrated electrode terminal, thereby a manufacturing process may be simplifying, manufacturing costs may be reduced, and/or the strength of the electrode terminal and/or the secondary battery may be improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
    a case;
    an electrode assembly in the case, the electrode assembly including a first electrode plate, a separator, and a second electrode plate;
    a first electrode terminal electrically connected to the first electrode plate;
    a cap plate coupled with the case such that edges of the cap plate interface with edges of the case; and
    a gap in an interface between the cap plate and case, the gap being proximate the first electrode terminal,
    wherein the first electrode terminal includes:
        a first collecting plate electrically connected to the electrode assembly,
        a first connecting part extending from the first collecting plate, the first connecting part passing through the gap between the cap plate and the case, and the first connecting part extending to an outer surface of the cap plate, and
        a first terminal part extending from the first connecting part, the first terminal part protruding beyond the cap plate, and
    wherein the first connecting part includes:
        a first bent region, the first bent region being bent from the first collecting plate and being coupled to an inner surface of the cap plate,
        a first pass region, the first pass region extending from the first bent region and passing through the gap between the cap plate and the case, and
        a second bent region, the second bent region being bent from the first pass region and being coupled to the outer surface of the cap plate.

2. The secondary battery as claimed in claim 1, wherein the first collecting plate, the first connecting part, and the first terminal part of the first electrode terminal are integrally formed as one continuous piece that extends from an inside of the case to an outside of the case.

3. The secondary battery as claimed in claim 1, wherein the cap plate includes a first coupling recess coupled with the second bent region of the first connecting part.

4. The secondary battery as claimed in claim 1, wherein the first bent region of the first connecting part is laser-weldingly coupled to the inner surface of the cap plate.

5. The secondary battery as claimed in claim 1, wherein the first bent region, the first pass region, and the second bent region of the first connecting part are integrally formed and the cap plate is between the first bent region and the second bent region.

6. The secondary battery as claimed in claim 5, wherein the first bent region and second bent region are parallel to the cap plate, and the first pass region is perpendicular to the first bent region and the second bent region such that the first bent region, the first pass region, and the second bent region surround a lateral end of the cap plate.

7. The secondary battery as claimed in claim 1, wherein the first terminal part includes:
   a first region, the first region being bent from the first connecting part and extending away from the cap plate;
   a second region, the second region being bent from the first region and being spaced apart from the cap plate;
   a third region, the third region being bent from the second region and extending toward the cap plate; and
   a fourth region, the fourth region being bent from the third region and being coupled to the cap plate.

8. The secondary battery as claimed in claim 7, wherein the first region, the second region, and the third region of the terminal part are integrally formed as a protrusion on the cap plate.

9. The secondary battery as claimed in claim 7, wherein the cap plate includes a second coupling recess coupled with the fourth region.

10. The secondary battery as claimed in claim 1, wherein the first electrode terminal is electrically connected to the cap plate.

11. The secondary battery as claimed in claim 1, wherein the first electrode terminal includes aluminum or aluminum alloy.

12. The secondary battery as claimed in claim 1, wherein a side of the case is provided with a coupling ledge, the first connecting part of the first electrode terminal being coupled to the coupling ledge.

13. The secondary battery as claimed in claim 12, wherein a first pass region of the first connecting part is between the cap plate and the case, and the first pass region overlaps the coupling ledge of the case.

14. The secondary battery as claimed in claim 1, wherein the cap plate, the first connecting part, or both is laser-weldingly coupled to the case.

15. The secondary battery as claimed in claim 1, wherein both the first connecting part and the first terminal part contact the outer surface of the cap plate.

16. The secondary battery as claimed in claim 1, further comprising a second electrode terminal electrically connected to the second electrode plate, the second electrode terminal including:
   a second collecting plate electrically connected to the electrode assembly;
   a second terminal column, the second terminal column being electrically connected to the second collecting plate and passing through the cap plate; and
   a second terminal plate, the second terminal plate being on the outer surface of the cap plate and being coupled to the second terminal column.

17. The secondary battery as claimed in claim 16, wherein the first terminal part extends a first distance away from the outer surface of the cap plate and the second terminal column extends a second distance away from the outer surface of the cap plate, the first and second distances being the same.

18. The secondary battery as claimed in claim 16, wherein the second electrode terminal includes copper or copper alloy.

19. The secondary battery as claimed in claim 16, further comprising an insulation member between the second electrode terminal and the cap plate.

* * * * *